United States Patent
Morris et al.

(10) Patent No.: US 8,070,448 B2
(45) Date of Patent: Dec. 6, 2011

(54) SPACERS AND TURBINES

(75) Inventors: Mark C. Morris, Phoenix, AZ (US);
Milton Ortiz, Scottsdale, AZ (US);
David Waldman, Chandler, AZ (US);
James Kroeger, Tempe, AZ (US)

(73) Assignee: Honeywell International Inc.,
Morristown, NJ (US)

( * ) Notice: Subject to any disclaimer, the term of this patent is extended or adjusted under 35 U.S.C. 154(b) by 630 days.

(21) Appl. No.: 12/261,305

(22) Filed: Oct. 30, 2008

(65) Prior Publication Data

US 2010/0111699 A1    May 6, 2010

(51) Int. Cl.
*F04D 29/34* (2006.01)

(52) U.S. Cl. ................. 416/219 R; 416/204 R
(58) Field of Classification Search .......... 416/219 R, 416/204 R
See application file for complete search history.

(56) References Cited

U.S. PATENT DOCUMENTS

| | | | |
|---|---|---|---|
| 3,635,587 A * | 1/1972 | Giesman et al. | 416/97 R |
| 3,653,781 A * | 4/1972 | Cooper | 416/221 |
| 3,832,092 A * | 8/1974 | Manharth | 416/220 R |
| 4,265,595 A * | 5/1981 | Bucy et al. | 416/220 R |
| 4,872,812 A | 10/1989 | Hendley et al. | |
| 4,921,405 A * | 5/1990 | Wilson | 416/241 R |
| 6,435,813 B1* | 8/2002 | Rieck et al. | 415/115 |
| 7,137,783 B2 | 11/2006 | Pabion et al. | |
| 7,374,400 B2 | 5/2008 | Boswell | |
| 7,713,029 B1* | 5/2010 | Davies | 416/219 R |
| 2005/0042077 A1* | 2/2005 | Gekht et al. | 415/116 |
| 2005/0135921 A1* | 6/2005 | Busch et al. | 415/115 |

\* cited by examiner

*Primary Examiner* — Nitin Parekh

(74) *Attorney, Agent, or Firm* — Ingrassia Fisher & Lorenz, P.C.

(57) ABSTRACT

Spacers and turbines are provided. In an embodiment, and by way of example only, a spacer includes a strip, a first retention flange, and a second retention flange. The strip has a first edge, a second edge, and an impingement surface, and the impingement surface extends axially along the strip between the first edge and the second edge and is substantially flat. The first retention flange is recessed relative to the impingement surface and extends away from the first edge of the strip. The second retention flange is recessed relative to the impingement surface and extends away from the second edge of the strip.

20 Claims, 5 Drawing Sheets

SPACERS AND TURBINES

TECHNICAL FIELD

The inventive subject matter generally relates to turbines, and more particularly relates to spacers for use in turbines.

BACKGROUND

Gas turbine engines, such as turbofan gas turbine engines, may be used to power various types of vehicles and systems, such as aircraft. Typically, these engines include turbines that rotate at a high speed when blades (or airfoils) extending therefrom are impinged by high-energy compressed air. Consequently, the blades are subjected to high heat and stress loadings which, over time, may reduce their structural integrity.

To improve blade structural integrity, a blade cooling scheme is typically incorporated into the turbines. The blade cooling scheme is included to maintain the blade temperatures within acceptable limits. In some cases, the blade cooling scheme directs cooling air through an internal cooling circuit formed in the blade. The internal cooling circuit consists of a series of connected, serpentine cooling passages, which incorporate raised or depressed structures therein. The serpentine cooling passages increase the cooling effectiveness by extending the length of the air flow path. In this regard, the blade may have multiple internal walls that form intricate passages through which the cooling air flows to feed the serpentine cooling passages. The blade cooling scheme may also include platform cooling, in some cases. For example, openings may be formed through a turbine disk from which the blades radiate, and the openings may direct cool air from a cool air source onto a platform of the blade.

Although the above-described blade cooling scheme adequately cools the blades during engine operation, it may be improved. In particular, the openings for cooling the blade platform may be relatively difficult to configure and/or form for maximum effectiveness. Additionally, because blade airfoils are exposed to gases at high temperatures (e.g., temperatures greater than about 1100-1800° C.) and gases flowing at high velocities (e.g., with Mach numbers in the range of 0.3 to 1.3) during operation, cooling air directed to the blade platform may be stripped off. Moreover, hot flow path gases flowing along the blade airfoil may migrate to the platform, which may cause the platform to operate in temperatures that are higher than for which the platforms are designed. As a result, the blade and/or blade platform may be exposed to high thermal strains, which may result in thermo-mechanical fatigue.

Accordingly, it is desirable to have an improved blade platform configuration that reduces thermo-mechanical fatigue and other forms of distress, when exposed to high temperatures and high velocities. In addition, it is desirable to have an improved platform configuration that is relatively simple and inexpensive to implement and that may be retrofitted into existing engines. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Spacers and turbines are provided. In an embodiment, and by way of example only, a spacer includes a strip, a first retention flange, and a second retention flange. The strip has a first edge, a second edge, and an impingement surface, and the impingement surface extends axially along the strip between the first edge and the second edge and is substantially flat. The first retention flange is recessed relative to the impingement surface and extends away from the first edge of the strip. The second retention flange is recessed relative to the impingement surface and extends away from the second edge of the strip.

In another embodiment, by way of example only, a turbine includes a hub, a first blade, a second blade, and a spacer. The hub includes an outer peripheral surface, a first blade attachment slot, and a second blade attachment slot. The first blade includes a first airfoil, a first platform, and a first blade attachment section, the first airfoil is disposed on the first platform, and the first blade attachment section extends from the first platform and disposed in the first blade attachment slot. The second blade includes a second airfoil, a second platform, and a second blade attachment section, the second airfoil is disposed on the second platform, and the second blade attachment section extends from the second platform and is disposed in the second blade attachment slot such that an edge of the first platform of the first blade and an edge of the second platform of the second blade are spaced apart from each other. The spacer includes a strip, a first retention flange, and a second retention flange. The strip has a first edge, a second edge, and an impingement surface. The impingement surface extends axially along the strip between the first edge and the second edge, and the impingement surface is substantially flat and located between the first blade and the second blade. The first retention flange is recessed relative to the impingement surface and extends away from the first edge of the strip and is at least partially disposed between the outer peripheral surface of the hub and the platform of the first blade. The second retention flange is recessed relative to the impingement surface and extends away from the second edge of the strip and is at least partially disposed between the outer peripheral surface of the hub and the platform of the second blade.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
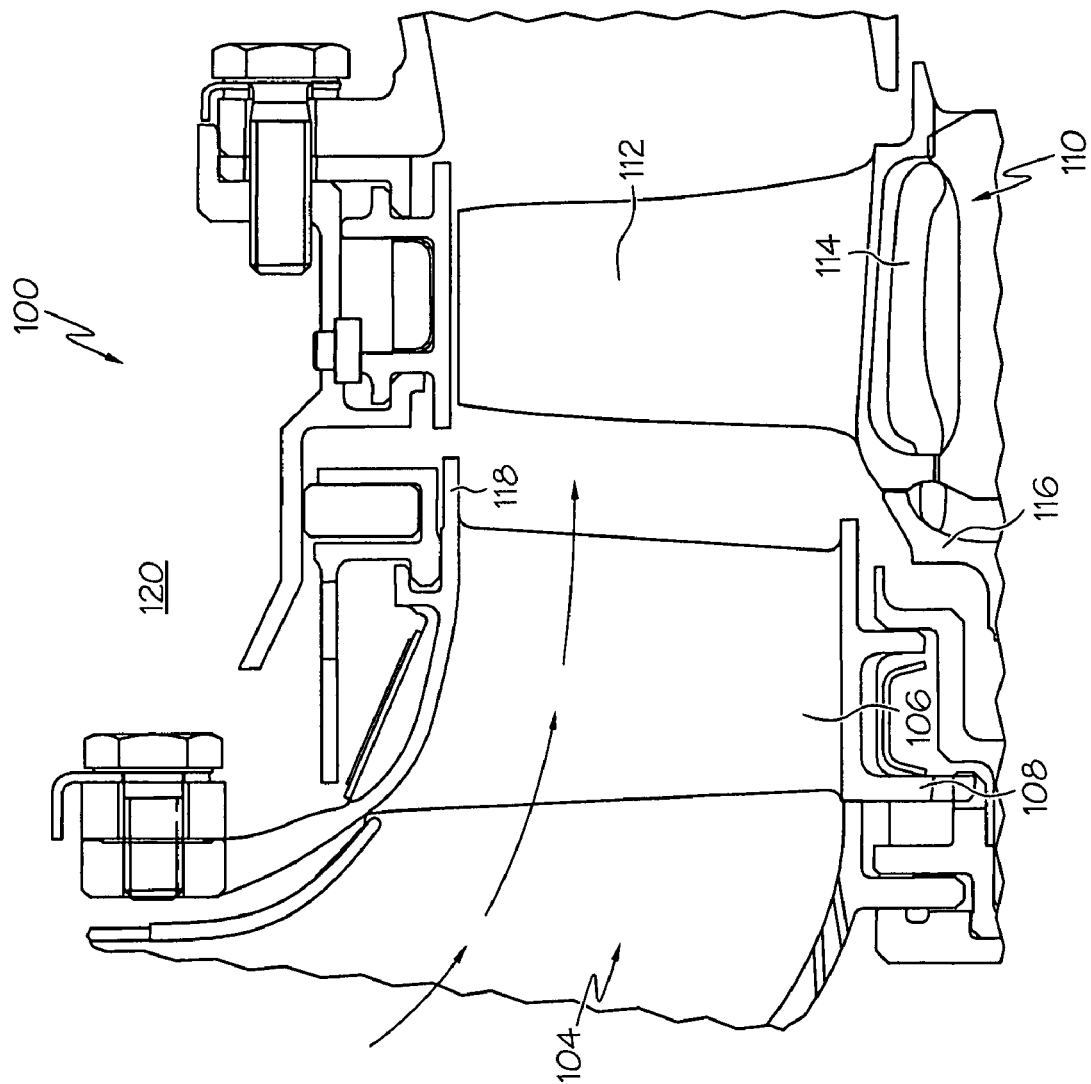
FIG. 1 is a cross-sectional side view of a turbine section of an engine, according to an embodiment.

FIG. 1 is a cross-sectional side view of a portion of a turbine section 100 of an engine, according to an embodiment. The turbine section 100 receives high temperature (e.g., temperature typically in the range of 1100-1800° C.) gases from an upstream engine combustor (not shown) to produce energy for the engine and/or components coupled to the engine. In an embodiment, the turbine section 100 includes a turbine nozzle 104 that has a plurality of static vanes 106 mounted circumferentially around a ring 108. The static vanes 106 direct the gases from the combustor to a turbine 110. According to an embodiment, the turbine 110 includes a plurality of blades 112 and spacers 114 (only one of each are shown) that are retained in axial position by a retention plate 116. When the blades 112 are impinged upon by the gases, the gases cause the turbine 110 to spin. According to an embodiment, an outer circumferential wall 118 surrounds the static vanes and the plurality of blades 112 and defines a portion of a compressor plenum 120. The compressor plenum 120 receives bleed air from a compressor section (not shown), which may be directed through one or more openings in the outer circumferential wall 118 towards the plurality of blades 112 to cool the blades 112.

Figure 2:
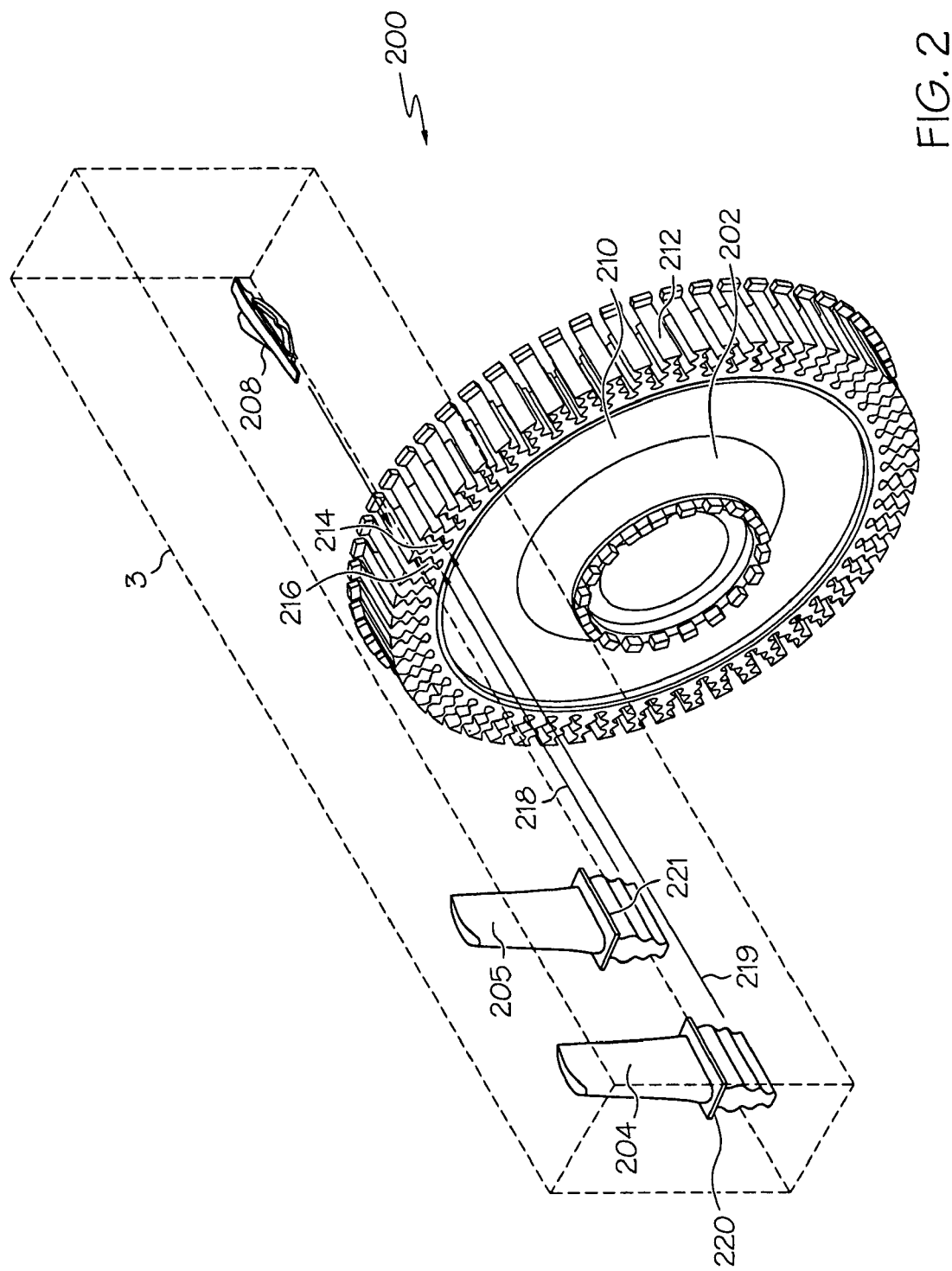
FIG. 2 is an exploded view of a portion of a turbine, according to an embodiment.
Figure 3:
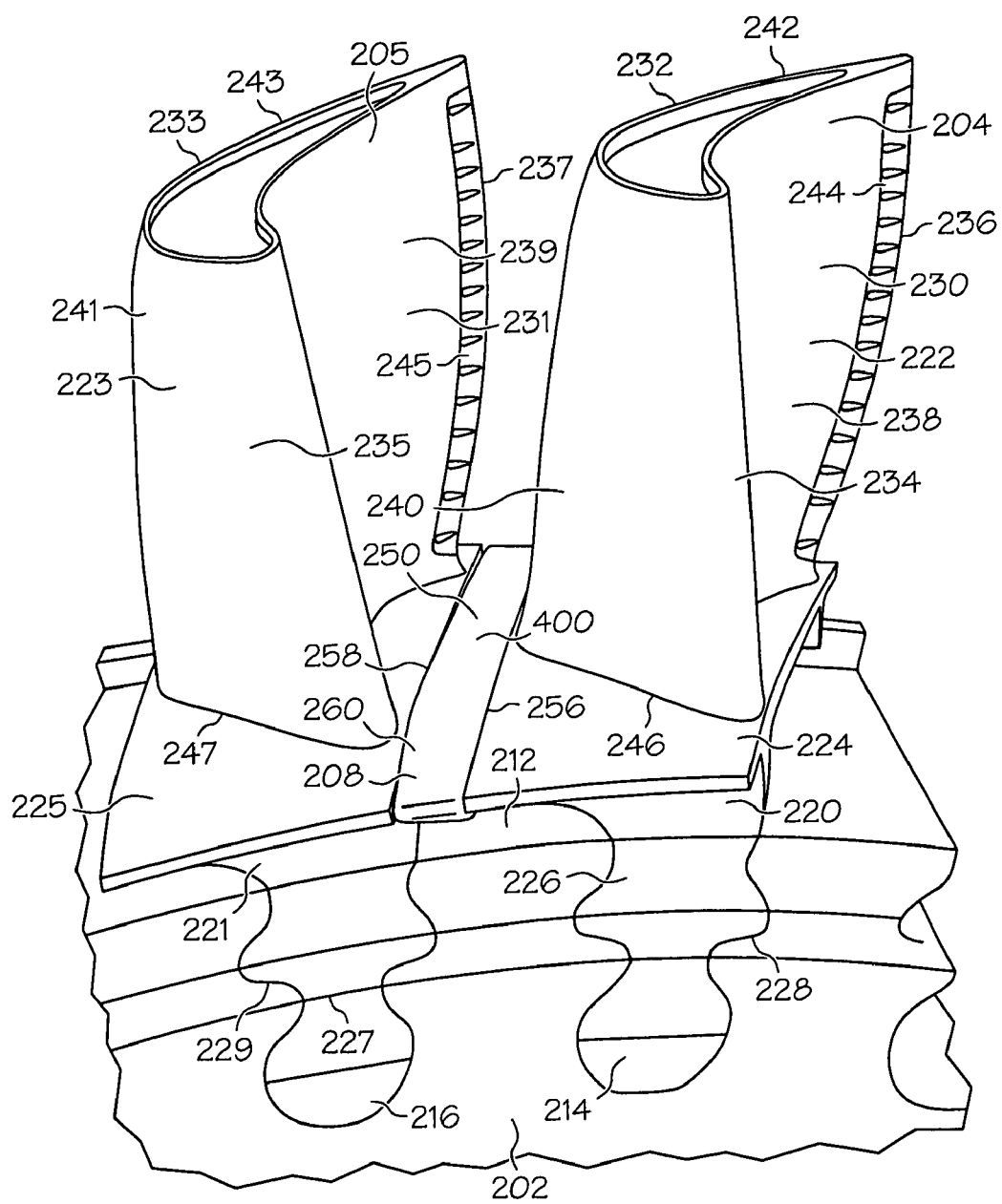
FIG. 3 is a close-up, isometric view of a portion of the turbine of FIG. 2 indicated by dotted box 3 in an assembled state, according to an embodiment.

FIG. 2 is an exploded view of a portion of a turbine 200, according to an embodiment, and FIG. 3 is a close-up, isometric view of a portion of the turbine 200 indicated by dotted box 3 in an assembled state, according to an embodiment. With reference to FIGS. 2 and 3, the turbine 200 includes a hub 202, blades 204, 205 and spacers 208, in accordance with an embodiment. The hub 202 is disk-shaped and has an outer rim 210 and an outer peripheral surface 212. According to an embodiment, the hub 202 may have an outer diameter in a range of from about 2 cm to about 30 cm. In another embodiment, the outer diameter of the hub 202 may be greater or less than the aforementioned range. In another embodiment, the hub 202 may have a thickness, or axial length, in a range of from about 5 cm to about 20 cm. In other embodiments, the thickness may be greater or less than the aforementioned range.

The hub 202 has a plurality of circumferentially formed blade attachment slots 214, 216 formed in its outer rim 210. Although fifty-six blade attachment slots 214, 216 are shown, more or fewer slots may be included in other embodiments. Each blade attachment slot 214, 216 is configured to attach a respective turbine blade 204, 205 to the hub 202, as indicated by arrows 218, 219 in FIG. 2. To allow the hub 202 to maintain structural integrity during engine operation, the hub 202 may be made of one or more superalloys, such as nickel-based superalloys, or other types of superalloys.

With continued reference to FIG. 3, the blades 204, 205 each include a shank 220, 221, an airfoil 222, 223, a platform 224, 225, and a blade attachment section 226, 227. For simplicity, description of each blade part will be provided with reference to blades 204, 205. However, it will be appreciated that the description may be applied to other blades that are not shown, but that may be attached to hub 202. In any case, each platform 224, 225 is configured to radially contain turbine airflow. Each blade attachment section 226, 227 provides an area in which a firtree 228, 229 is machined. In an embodiment, the firtree 228, 229 corresponds with a firtree shape formed in a respective blade attachment slot 214, 216. However, in other embodiments, any one of numerous other shapes suitable for attaching the blade 204, 205 to the hub 202 may be alternatively machined therein.

Each airfoil 222, 223 has two outer walls 230, 231, 232, 233, each wall 230, 231, 232, 233 having outer surfaces that define an airfoil shape. The airfoil shape includes a leading edge 234, 235, a trailing edge 236, 237, a pressure side 238, 239 along the first outer wall 230, 231, a suction side 240, 241 along the second outer wall 232, 233, a blade tip 242, 243, a pressure side discharge trailing edge slot 244, 245, and an airfoil platform fillet 246, 247. The blades 204, 205 may be single crystal blades comprising a nickel-based superalloy. Suitable nickel-based superalloys include, but are not limited to, Mar-M-247, SC180, and CMSX3. Though not shown, each blade 204, 205 may have an internal cooling circuit formed therein. The internal cooling circuit may extend from an opening in the platform 224, 225 through the blade 204, 205 and may include various passages that eventually communicate with the trailing edge slot 244, 245 or other openings (not shown) that may be formed in the blade 204, 205.

Figure 4:
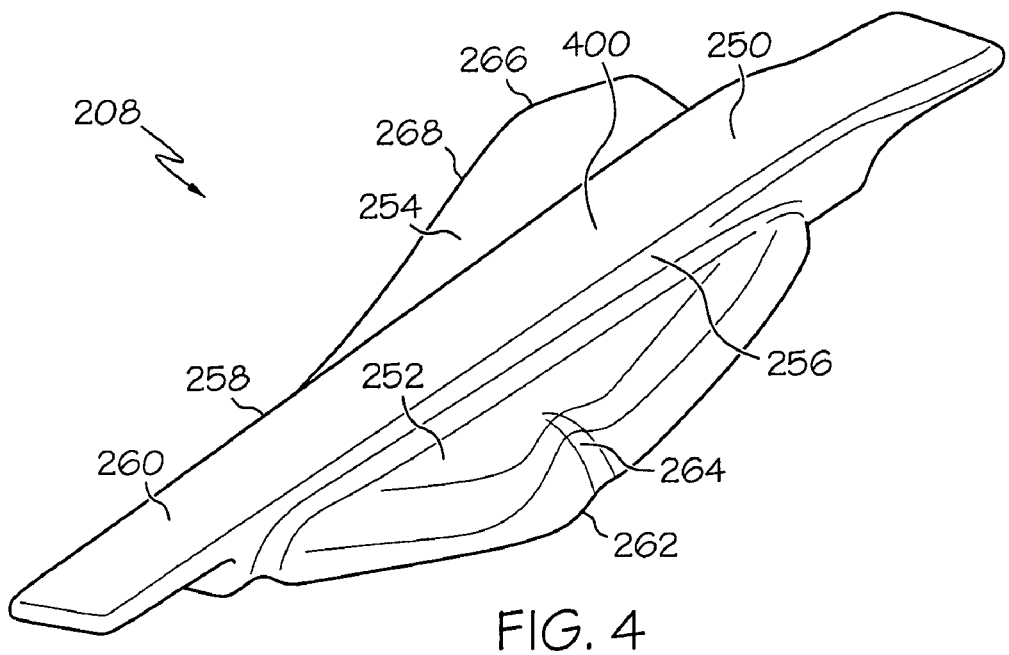
FIG. 4 is an isometric view of a spacer, according to an embodiment.

The spacer 208 is disposed over at least a portion of the outer peripheral surface 212 of the hub 202. In an embodiment, the spacer 208 is positioned between two blade attachment slots 214, 216 and is, thus, disposed between two blades 204, 205. FIG. 4 is an isometric view of the spacer 208 shown in FIGS. 2 and 3, according to an embodiment. The spacer 208 has a first side 400 that may be adapted to contact gases flowing across the turbine 200. To provide sufficient structural integrity to the spacer 208 during operation, the spacer 208 may comprise materials having high temperature (e.g., higher than about 1100-1300° C.) capabilities. In some embodiments, the materials may be a low density (e.g., density of about 0.2 lbm per cubic inches or less) material. Suitable materials that may be included in the spacer 208 include, but are not limited to, ceramics such as silicon nitride or ceramic matrix composites, or nickel-based superalloys such as SC180, or intermetallics such as nickel aluminide. In other embodiments, the spacer 208 may include a protective coating (not shown) or a suitable environmental protective layer capable of improving wear-resistance, oxidation-resistance, thermal insulation, or another property desirable for the operation of the spacer 208.

With reference to FIGS. 2-4, according to an embodiment, the spacer 208 includes a strip 250, a first retention flange 252, and a second retention flange 254. The strip 250 is adapted to maintain a predetermined distance between the two blades 204, 205 and has a first edge 256, a second edge 258, and an impingement surface 260, in an embodiment. The first edge 256 abuts the first blade 204, and the second edge 258 abuts the second blade 205. In an embodiment, the first and second edges 256, 258 are parallel to each other. In other embodiments, the edges 256, 258 may be non-parallel. In accordance with an embodiment, the impingement surface 260 is configured to define a portion of a flowpath for the gases that flow across the turbine 200. In this regard, the impingement surface 260 is located on the first side 400 of the spacer 208 and extends axially along the strip 250 between the first edge 256 and the second edge 258. In an embodiment, the impingement surface 260 is substantially flat and lies substantially flush with surfaces of the platforms 224, 225 of the blades 204, 205. In another embodiment, the impingement surface 260 has a width measured between the first and second edges 256, 258 that is substantially uniform along a length of the strip 250. According to still another embodiment, the width may be substantially equal to the predetermined distance between the blades 204, 205. In still another embodiment, the width may be slightly less than the predetermined distance between the blades 204, 205. In any case, in an example, the width may be in a range of from about 0.02 cm to about 2 cm. In other embodiments, the width may be greater or less than the aforementioned range. The impingement surface 260 may have an axial length that is substantially equal to a thickness or axial length of the hub 202, in an embodiment. In accordance with another embodiment, the axial length of the impingement surface 260 may be less than the thickness of the hub 202. For example, the axial length may be in a range of from about 0.5 cm to about 10 cm. In other embodiments, the axial length may be greater than or less than the aforementioned range.

The first retention flange 252 is recessed relative to the impingement surface 260 and extends away from the first edge 256 of the strip 250. According to an embodiment, the first retention flange 252 may have an approximately semi-ovular shape and may have a smooth, rounded surface. In another embodiment, the first retention flange 252 may include irregularities formed in its surface and may include a groove or indentation 264. In other embodiments, the first retention flange 252 may be rectangular or another suitable shape; however, it will be appreciated that the particular shape of the first retention flange 252 and contour of its surface may depend on a particular shape of the platform 224, 225 of the blade 204, 205 and the outer peripheral surface 212 of the hub 202 between which the first retention flange 252 is intended to retain.

The first retention flange 252 may have a widest width measured from the first edge 256 to a furthest outer edge 262 that is in a range of from about 0.1 cm to about 2 cm and an axial length in a range of from about 0.5 cm to about 10 cm. In accordance with another embodiment, the first retention flange 252 may be recessed a distance from the first edge 256, where the distance is in a range of from about 1 mm to about 10 mm. In other embodiments, the particular dimensions of the width, axial length, and recess distance of the first retention flange 252 may be greater or less than the aforementioned ranges and may depend on a particular configuration of a platform 224, 225 of a blade 204, 205.

The second retention flange 254 is recessed relative to the impingement surface 260 and extends away from the second edge 258 of the strip 250. According to an embodiment, the second retention flange 254 and the first retention flange 252 are located at substantially identical axial positions along the strip 250. In one example, the retention flanges 252, 254 overlap in axial positions.

The second retention flange 254 may have an approximately semi-ovular shape and may have a smooth, rounded surface. In another embodiment, the second retention flange 254 may include irregularities formed in its surface and may include a groove or indentation 266. In other embodiments, the second retention flange 254 may be rectangular or another suitable shape. In accordance with still another embodiment, the second retention flange 254 may have a shape that is substantially a mirror image of the first retention flange 252. However, it will be appreciated that the particular shape of the second retention flange 254 and contour of its surface may depend on a particular shape of the platform 224, 225 of the blade 204, 205 and the outer peripheral surface 212 of the hub 202 between which the second retention flange 254 will be retained.

The second retention flange 254 may have a widest width measured from the second edge 258 to a furthest outer edge 268 that is in a range of from about 0.1 to about 2 cm and an axial length in a range of from about 0.5 cm to about 10 cm. In accordance with another embodiment, the second retention flange 254 may be recessed a distance from the second edge 258, where the distance is in a range of from about 1 mm to about 10 mm. In other embodiments, the second retention flange 254 may have dimensions that are substantially similar to those of the first retention flange 252. In still other embodiments, the second retention flange 254 may have smaller or larger dimensions than the first retention flange 252. In any case, the particular dimensions of the width, axial length, and recess distance of the second retention flange 254 may be greater or less than the aforementioned ranges and may depend on a particular configuration of a platform 224, 225 of a blade 204, 205.

Figure 5:
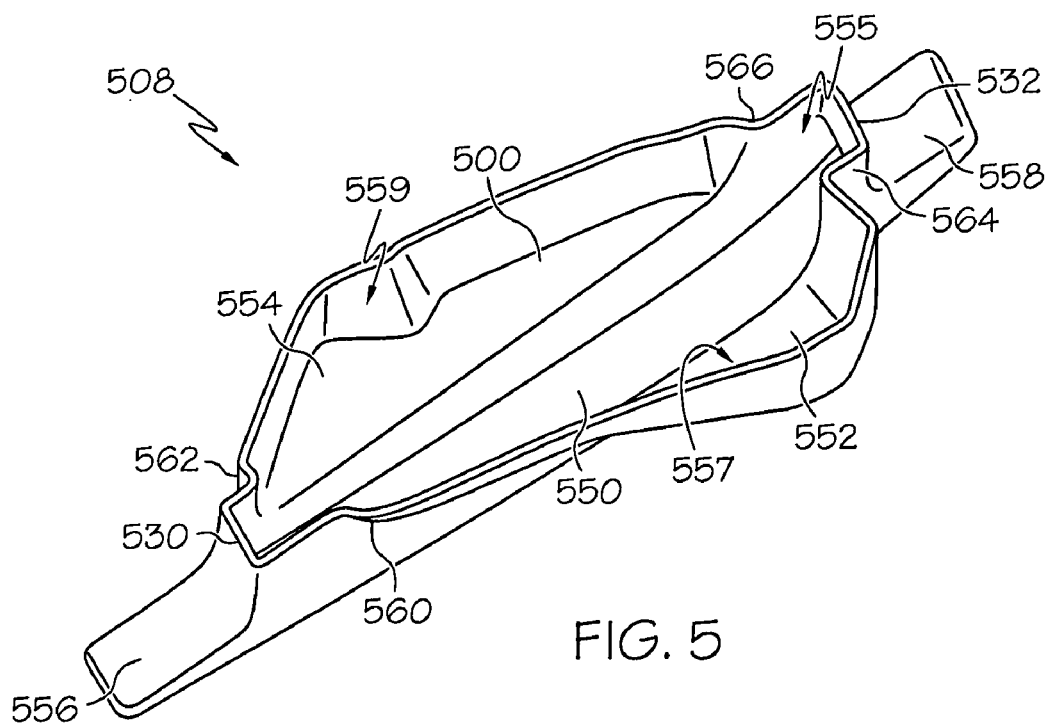
FIG. 5 is another isometric view of the spacer of FIG. 4, according to an embodiment.

FIG. 5 is an isometric view of a spacer 508, according to an embodiment. The spacer 508 in FIG. 5 may be substantially identical to spacer 208 depicted in FIGS. 2-4, except a second side 500 of the spacer 508 is depicted. The second side 500 of the spacer 508 is adapted to face radially inwardly toward a hub and may be contoured. In accordance with an embodiment, the spacer 508 includes a strip section 550 and retention flange sections 552, 554. From the second side 500 of the spacer 508, the strip section 550 may be recessed relative to the retention flanges sections 552, 554 and may include end walls 530, 532 that partially define an axial cavity 555. In another embodiment, the retention flanges sections 552, 554 may be disposed on either side of the axial cavity 555 having inner surfaces to define side cavities 557, 559. In any case, a longest axial length of the axial cavity 555 may be in a range of from about 0.5 cm to about 10 cm, in an embodiment, and a total width including a width of the axial cavity 555 and widths of the side cavities 557, 559 may be in an range of from about 0.2 cm to about 5 cm. In other embodiments, the lengths and widths may be greater or less than the aforementioned ranges.

In an embodiment, the cavities 555, 557, 559 may be adapted to circulate received cool air and may have an optimized surface contour for doing so. In another embodiment, the inner surfaces defining the cavity 555, 557, 559 may be relatively smooth. In still another embodiment, the inner surfaces may include grooves, projections or other flow-interrupting features to increase flow circulation within the cavity 555, 557, 559. In yet other embodiments, a coating or layer of material (not shown) may be included to improve oxidation, corrosion, or wear-resistance. For example, suitable materials may include, but are not limited to aluminide, platinum aluminide, or thermal barrier coatings.

To improve axial positioning over an outer peripheral surface of the hub, the spacer 508 may include one or two axial sections 556, 558. For example, the first axial section 556 may extend axially past first ends 560, 562 of the first and second retention flanges sections 552, 554. In another embodiment, the spacer 508 may additionally or alternatively include the second axial section 558 extending axially past second ends 564, 566 of the first and second retention flanges sections 552, 554. In another embodiment, the first and/or second axial sections 556, 558 extend past the end walls 530, 532, respectively, that partially define the axial cavity 555.

Figure 6:
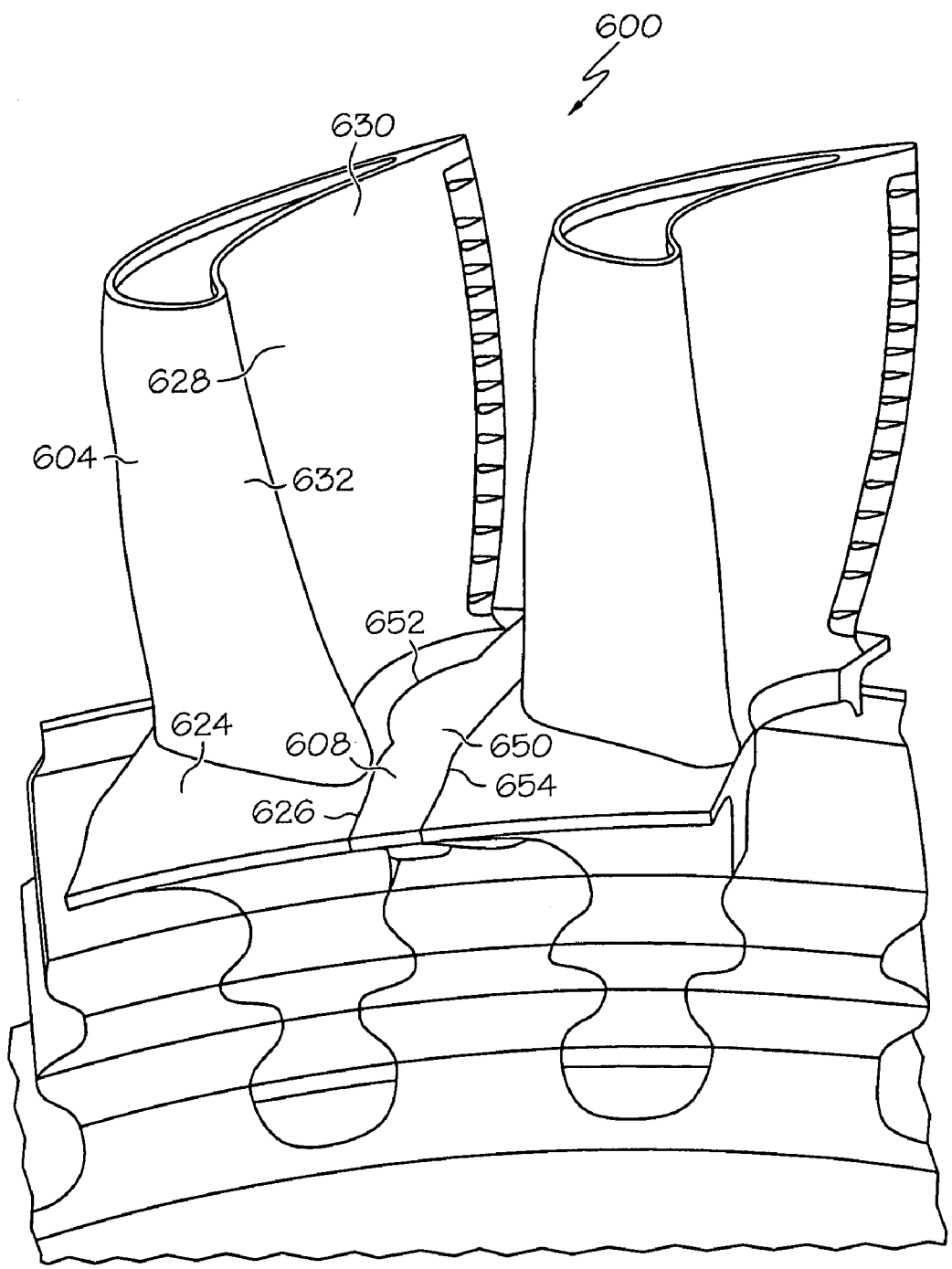
FIG. 6 is an isometric view of a portion of a turbine, according to another embodiment.

In some embodiments, additional cooling features may be desired. FIG. 6 is an isometric view of a portion of a turbine 600, according to another embodiment. Here, turbine 600 is substantially identical to turbine 200, except that turbine 600 includes a blade 604 with an abbreviated platform 624 and a widened spacer 608. In one embodiment, the platform 624 has an axially-extending edge 626 having a curved section proximate a pressure side wall 628 of an airfoil 630 extending from the platform 624. The axially-extending edge 626 may continue along a leading edge 632 of the airfoil 630 such that the platform 624 provides little to no flow surface adjacent to the airfoil leading edge 632. The spacer 608 may have a strip 650 having first and second edges 652, 654 that are non-parallel and that are not straight edges. Instead, the edges (e.g., first edge 652 of the strip 650) may have a contour that follows that of the axially-extending edge 626 of the platform 624.

In all of the above embodiments, although two blades and a single spacer are shown, more may be included in other embodiments. The particular number of blades and spacers may depend on the number of blade attachment slots. For example, a number of blades and a number of spacers may be equal to the number of total blade attachment slots.

In any case, the above-described turbine may reduce thermal distress during engine operation, as compared with conventional turbines. For example, when the turbine rotates, the blades and the spacers expand outwardly from a hub to which the blades are attached, as a result of centrifugal forces acting on the turbine. The outward expansion allows the spacers to seal openings that may be present between the blades and/or hub, which prevents hot gases flowing from the combustor from entering an internal cooling circuit that may be formed in the blade. As a result, cool air flowing through the internal cooling circuit may remain cool as it flows to various portions of the blade. Additionally, because the spacer is a separate piece between the platforms of two blades, the spacer may act as a friction damper. Specifically, the spacer may create friction when contacting the blades, which dampens vibration that may be experienced by the blades.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A spacer for a turbine comprising:
a strip having a first edge, a second edge, and an impingement surface, the impingement surface extending axially along the strip between the first edge and the second edge and being substantially flat, the strip being disposed over an outer peripheral portion of a hub and being positioned between two adjacent blade attachment slots;
a first retention flange recessed relative to the impingement surface and extending away from the first edge of the strip; and
a second retention flange recessed relative to the impingement surface and extending away from the second edge of the strip.

2. The spacer of claim 1, wherein the first retention flange and the second retention flange are located at substantially identical axial positions along the strip.

3. The spacer of claim 1, wherein:
the first retention flange has a first end;
the second retention flange has a first end; and
the strip has a first axial section extending axially past the first end of the first retention flange and the first end of the second retention flange.

4. The spacer of claim 3, wherein:
the first retention flange has a second end;
the second retention flange has a second end; and
the strip has a second axial section extending axially past the second end of the first retention flange and the second end of the second retention flange.

5. The spacer of claim 1, further comprising a first side and a second side and wherein:
the impingement surface is located on the first side;
a strip section is located on the second side and defines an axial cavity;
a first retention flange section is located on the second side and defines a first side cavity; and
a second retention flange section is located on the second side and defines a second side cavity.

6. The spacer of claim 1, further comprising a material selected from a group consisting of a ceramic, a nickel-based superalloy, and an intermetallic material.

7. The spacer of claim 6, wherein the ceramic comprises a material selected from a group consisting of silicon nitride and a ceramic matrix composite.

8. A spacer for a turbine having a first side and a second side, the spacer comprising:
a strip having a first edge, a second edge, and an impingement surface, the impingement surface extending axially along the strip between the first edge and located on the first side of the spacer, and the second edge and being substantially flat, the strip being disposed over an outer peripheral portion of a hub and being positioned between two adjacent blade attachment slots;
a first retention flange recessed relative to the impingement surface and extending away from the first edge of the strip;
a second retention flange recessed relative to the impingement surface and extending away from the second edge of the strip;
a strip section located on the second side and defining an axial cavity;
a first retention flange section located on the second side and defining a first side cavity; and
a second retention flange section located on the second side and defining a second side cavity.

9. The spacer of claim 8, further comprising a material selected from a group consisting of a ceramic, a nickel-based superalloy, and an intermetallic material.

10. The spacer of claim 9, wherein the ceramic comprises a material selected from a group consisting of silicon nitride and a ceramic matrix composite.

11. The spacer of claim 8, wherein:
the first retention flange has a first end;
the second retention flange has a first end; and
the strip has a first axial section extending axially past the first end of the first retention flange and the first end of the second retention flange.

12. A turbine, comprising:
a hub including an outer peripheral surface, a first blade attachment slot, and a second blade attachment slot;
a first blade including a first airfoil, a first platform, and a first blade attachment section, the first airfoil disposed on the first platform, and the first blade attachment section extending from the first platform and disposed in the first blade attachment slot;
a second blade including a second airfoil, a second platform, and a second blade attachment section, the second airfoil disposed on the second platform, and the second blade attachment section extending from the second platform and disposed in the second blade attachment slot such that an edge of the first platform of the first blade and an edge of the second platform of the second blade are spaced apart from each other; and
a spacer including:
a strip having a first edge, a second edge, and an impingement surface, the impingement surface extending axially along the strip between the first edge and the second edge, the impingement surface being substantially flat and located between the first blade and the second blade;

a first retention flange recessed relative to the impingement surface and extending away from the first edge of the strip and at least partially disposed between the outer peripheral surface of the hub and the platform of the first blade; and a second retention flange recessed relative to the impingement surface and extending away from the second edge of the strip and at least partially disposed between the outer peripheral surface of the hub and the platform of the second blade.

13. The turbine of claim 12, wherein:
the first platform of the first blade has an outer peripheral surface;
the second platform of the second blade has an outer peripheral surface; and
the impingement surface of the strip, the first platform of the first blade, and the second platform of the second blade are substantially flush with each other.

14. The turbine of claim 12, wherein:
the first platform of the first blade has an outer peripheral surface;
the second platform of the second blade has an outer peripheral surface; and
the impingement surface of the strip, the first platform of the first blade, and the second platform of the second blade are substantially flush with each other.

15. The turbine of claim 12, wherein:
the first retention flange of the spacer has a first end;
the second retention flange of the spacer has a first end; and
the strip of the spacer has a first axial section extending axially past the first end of the first retention flange and the first end of the second retention flange.

16. The turbine of claim 15, wherein:
the first retention flange has a second end;
the second retention flange has a second end; and
the strip has a second axial section extending axially past the second end of the first retention flange and the second end of the second retention flange.

17. The turbine of claim 12, wherein:
the spacer has a first side and a second side;
the impingement surface is located on the first side;
a strip section is located on the second side and defines an axial cavity;
a first retention flange section is located on the second side and defines a first side cavity; and
a second retention flange section is located on the second side and defines a second side cavity.

18. The turbine of claim 12, wherein the spacer comprises a material selected from a group consisting of a ceramic, a nickel-based superalloy, and an intermetallic material.

19. The turbine of claim 18, wherein the ceramic comprises a material selected from a group consisting of silicon nitride and a ceramic matrix composite.

20. The turbine of claim 12, further comprising a retention plate disposed adjacent to the hub and in contact with the spacer.

* * * * *